(12) United States Patent
Wessel et al.

(10) Patent No.: US 9,934,801 B1
(45) Date of Patent: Apr. 3, 2018

(54) OPTICALLY OPAQUE OVERLAY WITH PERIODIC STRUCTURES FOR A WAVEGUIDE OF A HEAT-ASSISTED MAGNETIC RECORDING SLIDER

(71) Applicant: Seagate Technology LLC, Cupertino, CA (US)

(72) Inventors: James Gary Wessel, Savage, MN (US); Chen Wang, Bloomington, MN (US); Chubing Peng, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/620,550

(22) Filed: Jun. 12, 2017

Related U.S. Application Data

(60) Provisional application No. 62/353,702, filed on Jun. 23, 2016, provisional application No. 62/474,196, filed on Mar. 21, 2017.

(51) Int. Cl.
| | |
|---|---|
| G11B 11/00 | (2006.01) |
| G11B 5/48 | (2006.01) |
| G11B 5/00 | (2006.01) |
| G11B 7/1263 | (2012.01) |
| G11B 11/105 | (2006.01) |
| G11B 7/126 | (2012.01) |
| G11B 5/60 | (2006.01) |

(52) U.S. Cl.
CPC .......... *G11B 5/4866* (2013.01); *G11B 5/6088* (2013.01); *G11B 7/126* (2013.01); *G11B 7/1263* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,400,887 B2* | 3/2013 | Iwanabe | G11B 5/314 |
| | | | 369/13.33 |
| 9,286,920 B1 | 3/2016 | Hu et al. | |
| 2012/0072931 A1* | 3/2012 | Imada | G11B 5/314 |
| | | | 369/13.32 |
| 2012/0092971 A1* | 4/2012 | Schreck | G11B 5/314 |
| | | | 369/13.33 |
| 2014/0140091 A1* | 5/2014 | Vasylyev | G02B 6/001 |
| | | | 362/606 |
| 2015/0348578 A1* | 12/2015 | Buettner | G11B 5/6088 |
| | | | 427/532 |

* cited by examiner

*Primary Examiner* — Tan X Dinh
(74) *Attorney, Agent, or Firm* — Hollingsworth Davis, LLC

(57) ABSTRACT

An apparatus comprises a slider having an air bearing surface and is configured for heat-assisted magnetic recording. The slider comprises a write pole, a near-field transducer (NFT) proximate the write pole, and an optical waveguide configured to receive light from a light source and couple the light to the NFT. The optical waveguide comprises first and second opposing major surfaces and opposing first and second edges connected to the first and second major surfaces. An optically opaque overlay is disposed on or adjacent one or both of the first and second major surfaces of the optical waveguide. Periodic structures are disposed on a surface of the optically opaque overlay facing the waveguide. The periodic structures are configured to organize stray light emanating from the waveguide for absorption by the optically opaque overlay.

20 Claims, 8 Drawing Sheets

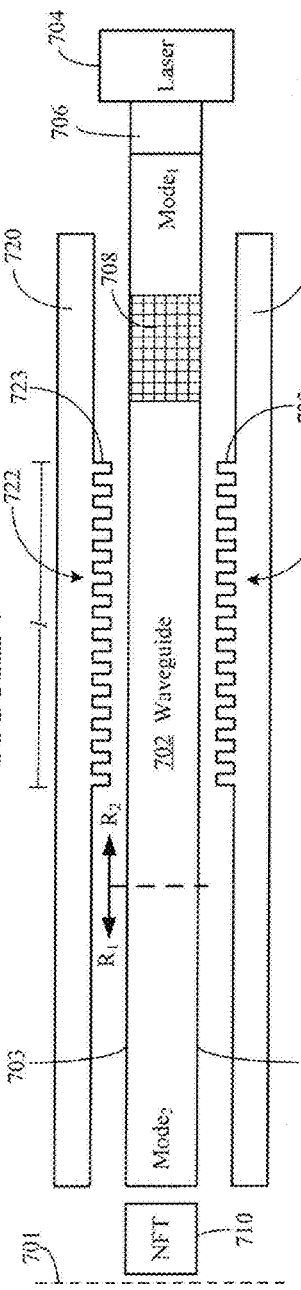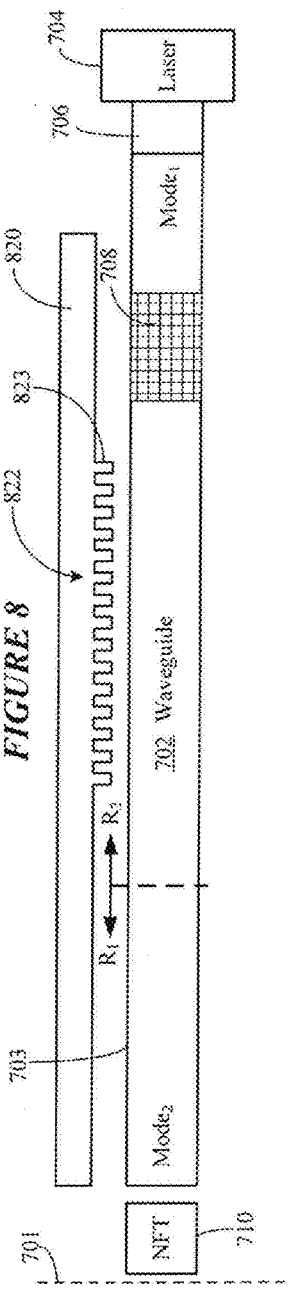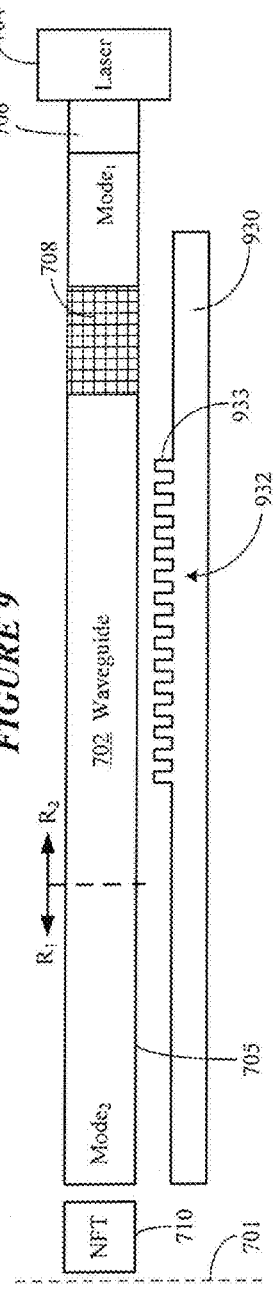

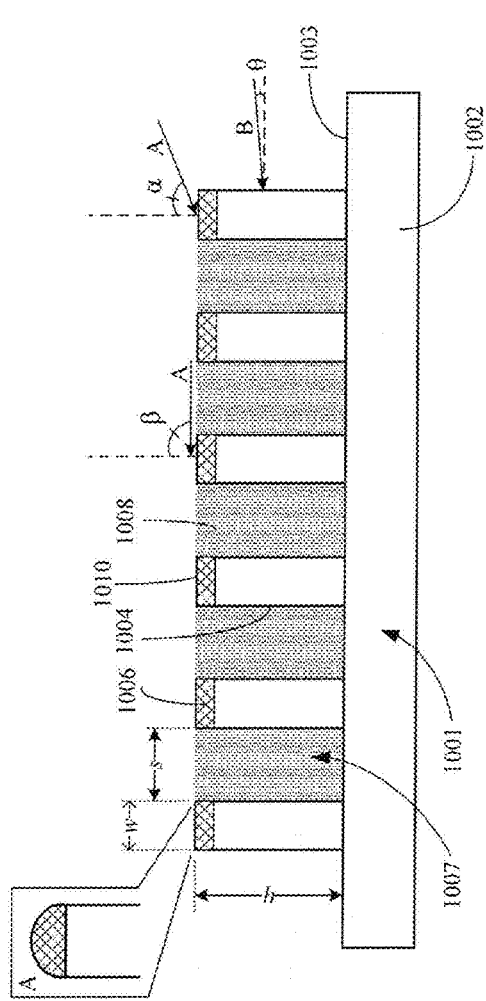
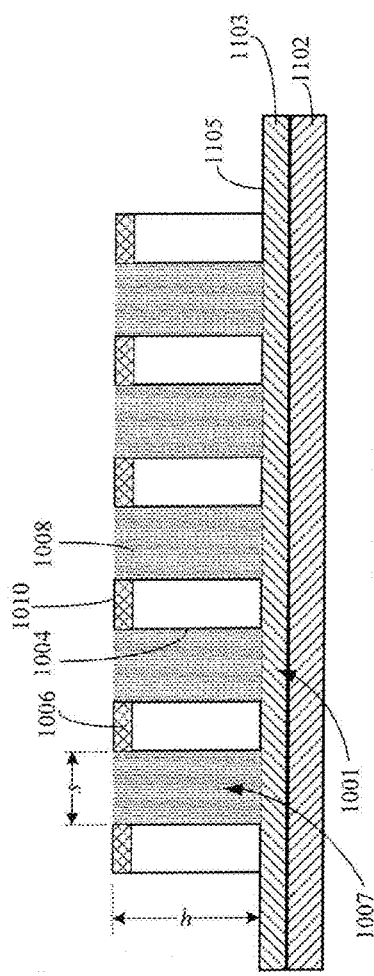

OPTICALLY OPAQUE OVERLAY WITH PERIODIC STRUCTURES FOR A WAVEGUIDE OF A HEAT-ASSISTED MAGNETIC RECORDING SLIDER

RELATED PATENT DOCUMENTS

This application claims the benefit of Provisional Patent Application Ser. No. 62/353,702, filed on Jun. 23, 2016 and Provisional Patent Application Ser. No. 62/474,196, filed on Mar. 21, 2017, to which priority is claimed pursuant to 35 U.S.C. § 119(e), and which are incorporated herein by reference in their entireties.

SUMMARY

Embodiments of the disclosure are directed to an apparatus comprising a slider having an air bearing surface and configured for heat-assisted magnetic recording. The slider comprises a write pole, a near-field transducer (NFT) proximate the write pole, and an optical waveguide configured to receive light from a light source and couple the light to the NFT. The optical waveguide comprises first and second opposing major surfaces and opposing first and second edges connected to the first and second major surfaces. An optically opaque overlay is disposed on or adjacent one or both of the first and second major surfaces of the optical waveguide. Periodic structures are disposed on a surface of the optically opaque overlay facing the waveguide. The periodic structures are configured to organize stray light emanating from the waveguide for absorption by the optically opaque overlay.

Other embodiments are directed to an apparatus comprising a slider having an air bearing surface and configured for heat-assisted magnetic recording. The slider comprises a write pole, an NFT proximate the write pole, and an optical waveguide configured to receive light from a light source and couple the light to the NFT. The optical waveguide comprises first and second opposing major surfaces and opposing first and second edges connected to the first and second major surfaces. An optically opaque overlay is disposed on or adjacent one or both of the first and second major surfaces of the optical waveguide. A layer of dielectric material is disposed on a surface of the optically opaque overlay facing the waveguide. Periodic structures are disposed on the layer of dielectric material. The periodic structures are configured to organize stray light emanating from the waveguide for absorption by the optically opaque overlay.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 7 illustrates a portion of a HAMR slider which includes an optical waveguide bounded by an optically opaque jacket arrangement comprising periodic structures in accordance with various embodiments;

FIG. 8 illustrates a portion of a HAMR slider which includes an optical waveguide bounded by an optically opaque jacket arrangement comprising periodic structures in accordance with various embodiments;

FIG. 9 illustrates a portion of a HAMR slider which includes an optical waveguide bounded by an optically opaque jacket arrangement comprising periodic structures in accordance with various embodiments;

FIG. 10 illustrates a portion of an optically opaque jacket arrangement comprising periodic structures in accordance with various embodiments;

FIG. 11 illustrates a portion of an optically opaque jacket arrangement comprising periodic structures in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR slider, sometimes referred to as a read/write element, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
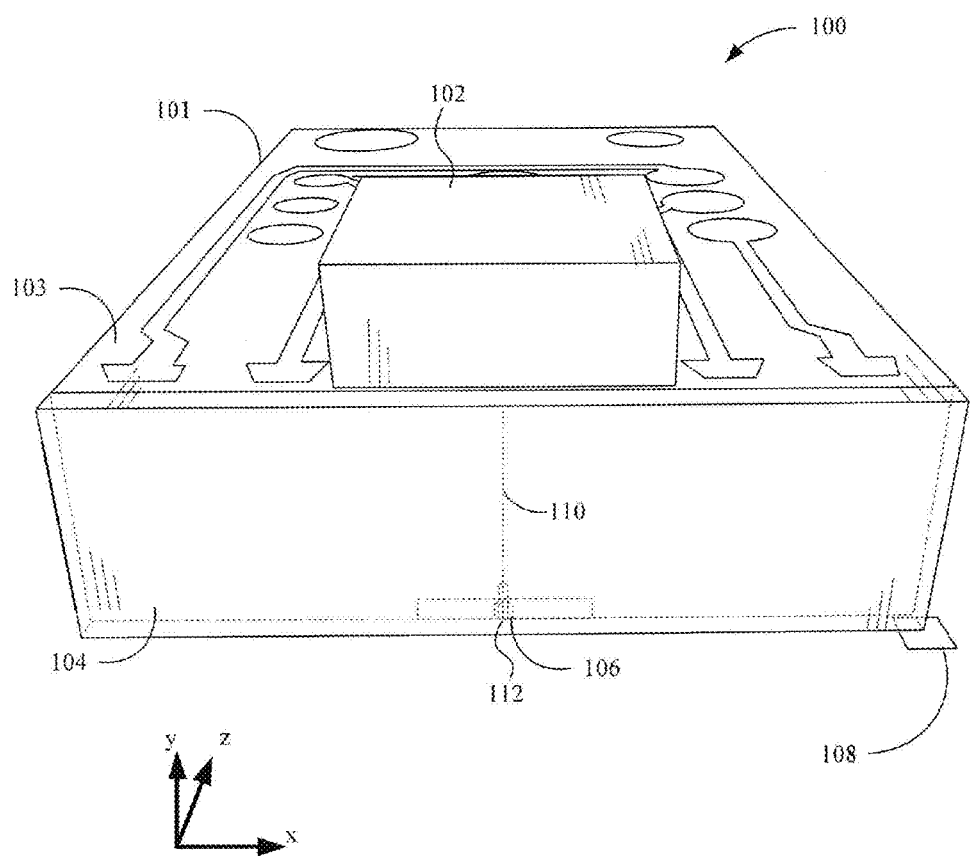
FIG. 1 is a perspective view of a slider assembly configured for heat-assisted magnetic recording (HAMR) according to a representative embodiment.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide system 110, are formed integrally within the slider body 101 (near a trailing edge surface 104 in this example) and function as an optical path that delivers energy from the laser diode 102 to the recording media via an NFT 112. The NFT 112 is near the writer of the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
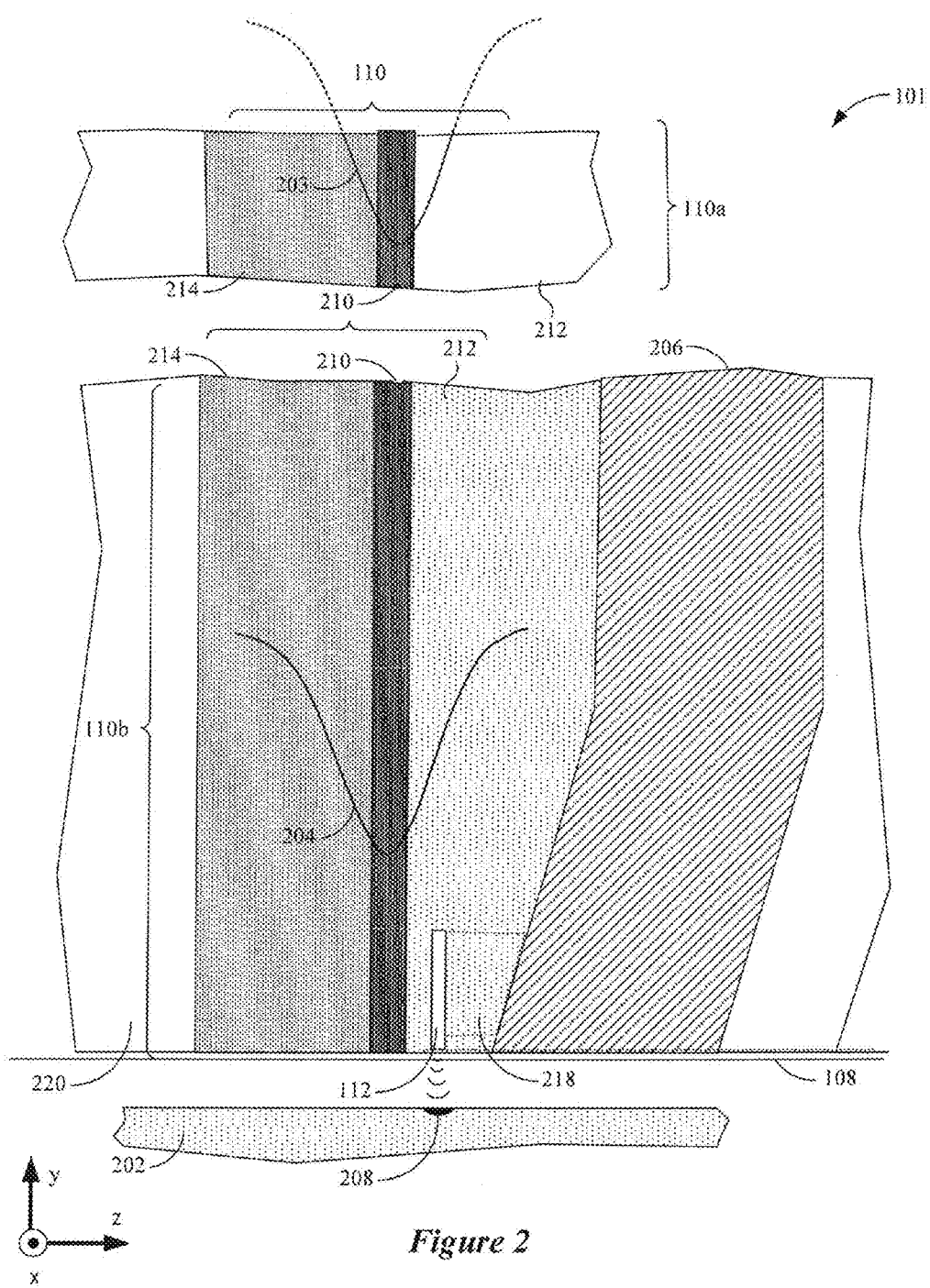
FIG. 2 is a cross-sectional view of portions of a slider body near an NFT according to a representative embodiment.

In FIG. 2, a cross-sectional view illustrates portions of the slider body 101 near the NFT 112 according to a representative embodiment. In this view, the NFT 112 is shown proximate to a surface of a magnetic recording medium 202, e.g., a magnetic disk. The waveguide system 110 delivers electromagnetic energy to the NFT 112, which directs the energy to create a small hotspot 208 on the recording medium 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

According to some embodiments, the waveguide system 110 includes a first portion 110a configured to receive light 203 from a light source (e.g., laser 102 in FIG. 2) at a fundamental transverse electric (TE) mode (e.g., TE00). The first portion 110a may include at least a three-dimensional waveguide extending along the light propagation direction (negative y-direction). The waveguide system 110 also includes a second portion 110b that outputs light 204 to an output region of the waveguide near the NFT 112 at a higher-order TE mode (e.g., TE10). A mode order converter (see, e.g., FIGS. 7-9) can be integrated in the first or second portions 110a and 110b. Alternatively, the dimensions and relative orientation of the portions 110a-b can be selected to achieve the mode conversion of light propagated to the NFT 112. The NFT 112 receives the light 204 at the higher-order mode and generates surface plasmons that heat the magnetic recording medium 202. The NFT 112 may include or be coupled to a heat sink 218 that extends to the write pole 206.

The waveguide portions 110a-b are formed via a layer of core material 210 surrounded by cladding layers 212 and 214. The core layer 210 and cladding layers 212, 214 may be made from dielectric materials such as Al2O3, SiOxNy, SiO2, Ta2O5, TiO2, ZnS, SiNx, Nb2O5, AlN, Hf2O3, Y2O3, etc. Generally, the dielectric materials are selected so that the refractive index of the core layer 210 is higher than refractive indices of the cladding layers 212 and 214. This arrangement of materials facilitates efficient propagation of light through the waveguide system 110. While the first and second portions 110a-b are co-planar in this example, they may be offset from each other in the z-direction. For example, the cores may have different thicknesses but be centrally aligned in the z-direction. In such a case, they may be formed from different core and/or cladding layers using the same or different materials.

A portion of the laser light energy communicated to an NFT is absorbed and converted to heat within the slider. This heating results in thermal expansion of the ABS materials, protrusion at the ABS, and a change in both head-media clearance and head-media separation. Laser induced protrusion (LIP) is a persistent problem for HAMR heads. LIP can reduce areal density (e.g., from HMS effects) and negatively affect reliability (e.g., due to burnish and excessive heating of the reader and read heater). LIP can be expressed as LIWP (laser induced writer protrusion) and/or LIRP (laser induced reader protrusion).

Figure 3:
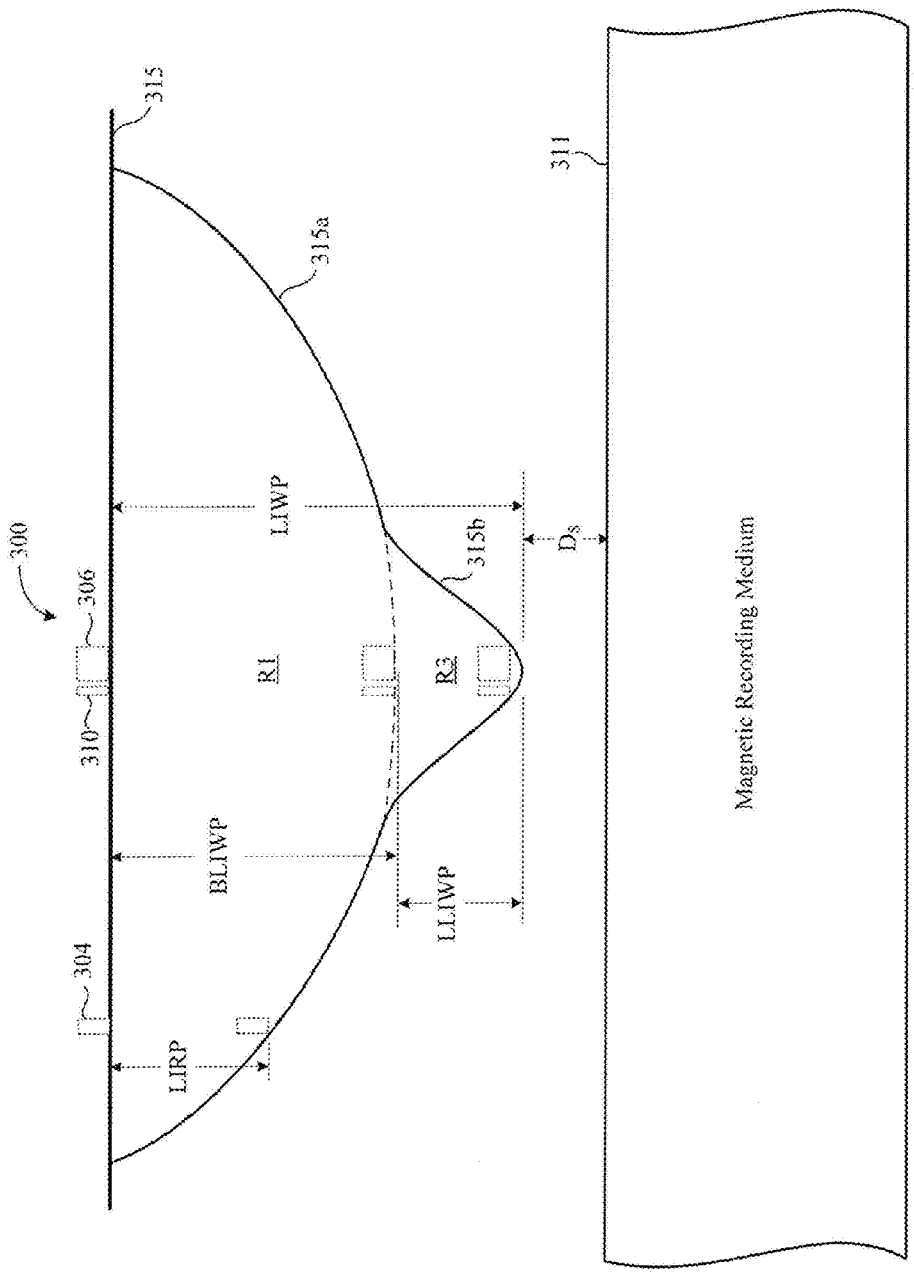
FIG. 3 is an exaggerated illustration of laser-induced protrusion at the air bearing surface (ABS) of a HAMR slider in accordance with various embodiments.

FIG. 3 is an exaggerated illustration of laser-induced protrusion at the ABS 315 of a HAMR slider 300 in accordance with various embodiments. More particularly, the protrusion of the slider ABS 315 shown in FIG. 3 is referred to herein as Laser-induced Writer Protrusion (LIWP). As is shown in FIG. 3, the region of LIWP encompasses a writer 306 and an NFT 310 of the slider. LIWP represents the full excursion of the protrusion developed at the ABS 315 due to heating of the NFT 310 by excitation of the laser and other heat sources (e.g., the writer 306 and writer heater). The reader 304 is also subject to displacement by the ABS protrusion resulting from excitation of the laser of the slider. Protrusion of the slider ABS 315 due to laser/NFT heating in the region that encompasses the reader 304 is referred to herein as Laser-induced Reader Protrusion (LIRP). Because the reader 304 is situated away from the NFT 310/writer 306, allowing for dissipation of laser-induced heat, LIRP is not as pronounced as LIWP. However, LIRP is quite noticeable and impacts reader performance. It is noted that the features shown in FIG. 3 are not drawn to scale.

LIWP is understood to include two protrusion components. The first component of LIWP is a broad protrusion component, referred to herein as Broad Laser-induced Writer Protrusion (BLIWP). As the term implies, a relatively broad region of the ABS 315 surrounding the writer 306 and NFT 310 expands to form a protruded region (volume) R1 in response to the heat generated by the NFT 310 and the writer 306 (and writer heater). The second component of LIWP is a local protrusion component, referred to herein as Local Laser-induced Writer Protrusion (LLIWP). LLIWP is a small and narrow protrusion (relative to the BLIWP) that extends from the BLIWP in a direction towards the surface of the magnetic recording medium 311. As can be seen in FIG. 3, the BLIWP component encompasses a significantly larger volume (in region R1) of ABS material relative to that (in region R3) of the LLIWP component. Evaluation of experimental sliders has revealed that LIWP typically ranges between about 3 and 4 nm, while LLIWP typically ranges between about 1 to 3 nm (<3 nm). It is understood that, although each of LIWP, BLIWP, LLIWP, and LIRP involves expansion of a volume of ABS material, these protrusion parameters are measured in terms of a distance (in nanometers) extending from the ABS 315 and along a plane normal to the ABS 315 in a direction towards the recording medium 311.

As was discussed previously, excitation of the laser causes optical energy to impinge on the NFT 310, causing significant heating at the ABS 315 in the region of the NFT 310. The heat produced by the NFT 310 and the writer 306 (and other thermal sources, such as the writer heater, reader, and reader heater) causes thermal expansion of the surrounding ABS material, resulting in the BLIWP. Heating of the NFT 310 also results in high power density in the local region immediately surrounding the NFT 310, resulting in development of the LLIWP. Although the ABS material in region R1 subject to BLIWP and that of region R3 subject to LLIWP is essentially the same, the thermal time constant of the material in region R1 and region R3 vary significantly from one another. For example, the thermal time constant of the material in region R1 (subject to BLIWP) is between about 100 and 300 μs, which is similar to that of ABS material subject to heating by the writer heater or the reader heater. The thermal time constant of the material in region R3 (subject to LLIWP) is around 1 μs or less.

Embodiments of the disclosure are directed to reducing laser induced protrusion at the ABS of a HAMR slider by incorporating one or more optically opaque overlays that incorporate periodic structures provided at an outer boundary of an optical waveguide of the slider. The optical waveguide can be a planar waveguide or a channel waveguide, for example. An optically opaque overlay refers to a structure (e.g., a shield) that is substantially non-transmissive (e.g., a barrier) to wavelengths of light communicated along an optical waveguide of a HAMR slider. For convenience, an optically opaque overlay is referred to herein as an optically opaque jacket, a waveguide jacket or simply a jacket.

An optically opaque jacket according to the present disclosure incorporates periodic structures configured to organize stray light emanating from the waveguide for absorption by the jacket. The periodic structures define a region of an optically opaque jacket that provides for low specular reflection that enhances absorption of stray light, while high thermal conductance of the jacket serves to dissipate absorbed optical power. The periodic structures serve as an optical grating, such as a diffraction grating, for organizing stray light for enhanced absorption by the optically opaque jacket. According to some embodiments, the periodic structures are configured as an omni-directional, omni-polarization absorber of stray light escaping from the waveguide. It has been demonstrated that heat dissipation in regions of light absorption is very effective at reducing optically generated protrusion at the ABS of a HAMR slider (e.g., a 30% reduction in BLIWP and LIRP). Provision of an optically opaque jacket of the present disclosure above and/or below a HAMR waveguide enhances absorption of stray light and dissipation of absorbed optical power, which reduces optically generated protrusion at the ABS of a HAMR slider.

It has been demonstrated that an optically opaque jacket formed from Au (~200 nm thick) that incorporates periodic structures according to the present disclosure provides a five-fold increase in thermal conductance and a five-fold reduction in specular reflection in comparison to a jacket constructed from Au and lacking the periodic structures. It has been demonstrated that an optically opaque jacket formed from Cr or W (~200 nm thick) that incorporates periodic structures according to the present disclosure provides a twenty five-fold increase in thermal conductance and a two-fold reduction in specular reflection in comparison to a jacket constructed from Cr or W and lacking the periodic structures.

A standard optically opaque jacket lacking periodic structures is constructed from homogeneous and isotropic films. While a standard jacket may have low specular reflection at certain angles of incident light and polarizations, a standard jacket has high specular reflection particularly at large angles of incidence and transverse electric (TE) polarization. It has been found that low specular reflection is very important for stability of the laser of a HAMR slider (e.g., to avoid laser mode hops).

Figure 4:
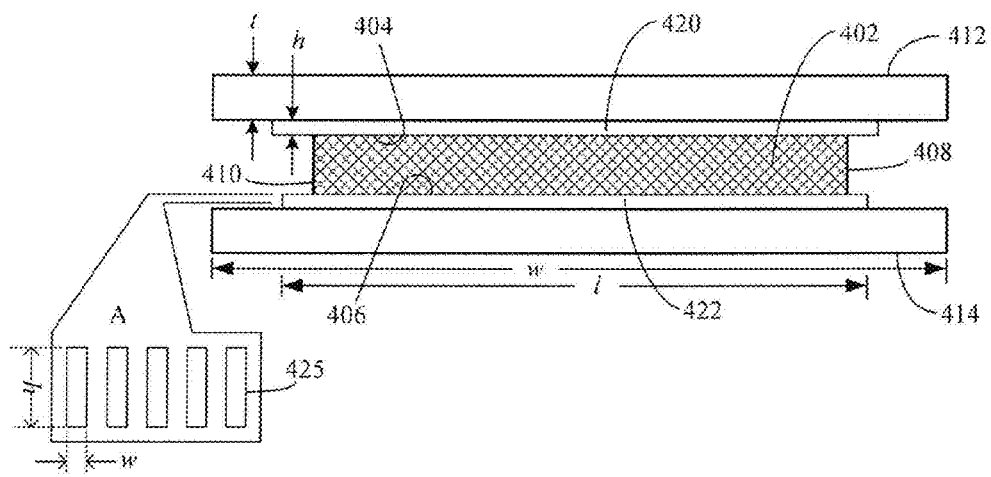
FIG. 4 illustrates a portion of a HAMR slider which includes an optical waveguide bounded by an optically opaque jacket arrangement comprising periodic structures in accordance with various embodiments.

FIG. 4 illustrates a portion of a HAMR slider which includes an optical waveguide 402 bounded by an optically opaque jacket arrangement in accordance with various embodiments. The waveguide 402 shown in FIG. 4 includes a first major surface 404 and an opposing second major surface 406. The waveguide 402 also includes opposing side surfaces 408 and 410. The first major surface 404 may be a major surface of an upper cladding layer of the waveguide 402, and the second major surface 406 may be a major surface of a lower cladding layer of the waveguide 402. In the embodiment shown in FIG. 4, a first optically opaque jacket 412 is disposed on or adjacent the first major surface 404 of the waveguide 402. A second optically opaque jacket 414 is disposed on or adjacent the second major surface 406 of the waveguide 402. The first and second jackets 412 and 414 are configured to prevent stray light emanating from the waveguide core from escaping from the first and second major surfaces 404 and 406 of the waveguide 402.

The optically opaque jackets 412 and 414 may be formed from light reflective material (e.g., Au, Ag, Cu, or Al) or light absorbing material (Fe, NiFe, Cr, or W). In some embodiments, the optically opaque jackets 412 and 414 may be formed from a combination of reflective and light absorbing material at different locations along the waveguide 402. For example, a first region (reflection region) of the jackets 412 and 414 proximate the NFT and extending into the slider body (e.g., within 20-50 µm of the ABS) can be formed from light reflective material. A second region (absorbing region) of the jackets 412 and 414 distal of the first region (e.g., beyond 20-50 µm from the ABS) can be formed from light absorbing material.

The first jacket 412 includes a structured region 420 comprising periodic structures that face a core of the waveguide 402. The second jacket 414 also includes a structured region 422 comprising periodic structures that face the core of the waveguide 402. Each of the structured regions 420 and 422 comprises an arrangement of periodic structures 425 (e.g., pillars) spaced apart from one another by a constant spacing, as shown in the exploded side view A in FIG. 4. The periodic structures 425 of the structured regions 420 and 422 are configured to organize stray light that escapes from the waveguide 402 for absorption by the first and second jackets 412 and 414, and by the periodic structures 425.

The first and second jackets 412 and 414 can have a thickness, t, of about 0.05 µm to about 2 µm and have a width, w, that is at least as wide as the waveguide 402. For example, the width, w, of the first and second jackets 412 and 414 can range between about 2 µm and about 20 µm. The first and second jackets 412 and 414 can have a length (into and out of the page) defined between the ABS and top of the slider. The length of the first and second jackets 412 and 414 can extend along all or only a portion of the length of the waveguide 402. For example, the length of the first and second jackets 412 and 414 can be between about 5 µm and about 200 µm, such as between about 10 µm and about 25 µm. The periodic structures 425 can have a height, h, of about 1 µm (e.g., 0.5-1.5 µm), a width, w, of between about 300 nm and 5000 nm, and a length, l, equal to or exceeding the width of the waveguide 402. For example, the length, l, of the periodic structures 425 can range between about 1 µm and 200 µm.

Figure 5:
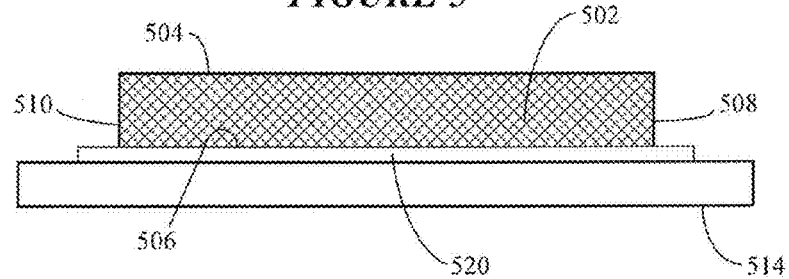
FIG. 5 illustrates a portion of a HAMR slider which includes an optical waveguide bounded by an optically opaque jacket arrangement comprising periodic structures in accordance with various embodiments.

FIG. 5 illustrates a portion of a HAMR slider which includes an optical waveguide 502 bounded by an optically opaque jacket arrangement in accordance with various embodiments. The waveguide 502 shown in FIG. 5 includes a first major surface 504, an opposing second major surface 506, and opposing side surfaces 508 and 510. In the embodiment shown in FIG. 5, only one optically opaque jacket 514 is disposed on or adjacent one of the two major surfaces 504 and 506. More particularly, optically opaque jacket 514 is disposed on or adjacent the second major surface 506 of the waveguide 502. Depending on the particular design of the HAMR slider, the jacket 514 can be disposed on or adjacent the major surface of either the upper cladding layer or the lower cladding layer.

The second jacket 514 includes a structured region 520 comprising periodic structures that face toward the core of the waveguide 510. The periodic structures of the structured region 520 are configured to organize stray light that escapes from the waveguide 510 for absorption by the second jacket 514. The second jacket 514 and structured region 520 can have dimensions discussed above with reference to FIG. 4.

Figure 6:
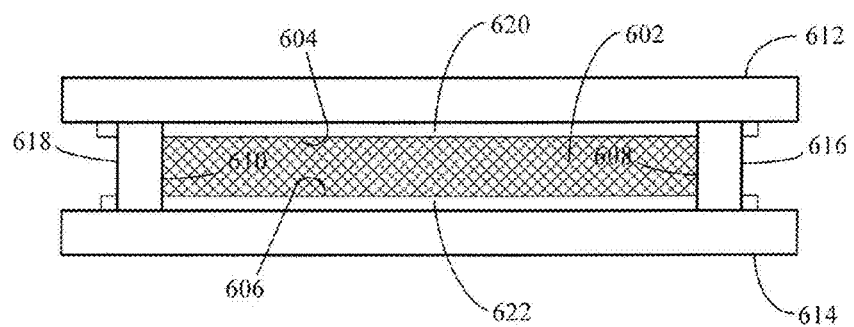
FIG. 6 illustrates a portion of a HAMR slider which includes an optical waveguide bounded by an optically opaque jacket arrangement comprising periodic structures in accordance with various embodiments.

FIG. 6 illustrates a portion of a HAMR slider which includes an optical waveguide 602 bounded by an optically opaque jacket arrangement in accordance with various embodiments. The waveguide 602 shown in FIG. 6 includes a first major surface 604, an opposing second major surface 606, and opposing side surfaces 608 and 610. In the embodiment shown in FIG. 6, a first optically opaque jacket 612 is disposed on or adjacent the first major surface 604 of the waveguide 602. A second optically opaque jacket 614 is disposed on or adjacent the second major surface 606 of the waveguide 602. A third optically opaque jacket 616 is disposed on or adjacent the first side surface 608 of the waveguide 602, and a fourth optically opaque jacket 618 is disposed on or adjacent the second side surface 610 of the waveguide 602. In FIG. 6, the optically opaque jacket arrangement encompasses the waveguide 602. In alternative embodiments, one of the first and second jackets 612 and 614 can be omitted and/or one of the third and fourth jackets 616 and 618 can be omitted.

The first jacket 612 includes a structured region 620 comprising periodic structures that face toward a core of the waveguide 610. The second jacket 614 includes a structured region 622 comprising periodic structures that face toward the core of the waveguide 610. Although not shown in FIG. 6, the third and fourth jackets 616 and 618 can include structured regions comprising periodic structures that face toward the core of the waveguide 610. The periodic structures of the structured regions 620 and 622 (and those of the third and fourth jackets 616 and 618 if present) are configured to organize stray light that escapes from the waveguide 610 for absorption by the first, second, third, and fourth jackets 612, 614, 616, and 618. The first and second jackets 612 and 614 and structured regions 620 and 622 can have dimensions discussed above with reference to FIG. 4. The height of the third and fourth jackets 616 and 618 is dependent on the thickness of the waveguide 602 (e.g., ~1-4 µm).

FIG. 7 illustrates a portion of a HAMR slider which includes an optical waveguide bounded by an optically opaque jacket arrangement in accordance with various embodiments. The waveguide 702 includes a first major surface 703 and a second major surface 705 that extend along the length of the waveguide 702. The waveguide 702 includes a first terminal end configured to receive light from a laser source 704 via an optical coupler 706. A second terminal end of the waveguide 702 is positioned proximate an NFT 710, which is situated at or near an ABS 701 of the slider. According to some embodiments, light entering the waveguide 702 via the coupler 706 is of a first mode, $Mode_1$, while light exiting the waveguide 702 at the second terminal end is of a second mode, $Mode_2$. The waveguide 702 includes a mode order converter 708, which is a region of the waveguide 702 configured to convert light from one mode to another mode.

According to various embodiments, the waveguide 702 is configured to receive light at the coupler 706 emitted by the laser source 704 at a fundamental transverse electric (TE) mode (e.g., TE00). A laser diode, for example, typically has a TE00-like output beam profile. However, a phase-shifted higher-order mode, e.g., TE10, is desired for coupling with some configurations of a plasmonic transducer, such as NFT 710. The mode order converter 708 converts light from the fundamental TE mode TE00 to a higher-order TE mode (e.g., TE10). It will be understood that various embodiments may be configured to excite other higher-order modes, e.g., a TE(n, m) mode, wherein n>0 and m≥0. The light at the higher-order mode, e.g., TE10, is directed to the NFT 710 which generates surface plasmons in response. The surface plasmons are directed to heat a spot of a magnetic recording medium in proximity to the slider. It is understood that the waveguide 702 can be configured for communicating light of different modes, such as transverse magnetic modes.

In the embodiment shown in FIG. 7, a first optically opaque jacket 720 is situated above the waveguide 702 at or near a boundary of the waveguide 702. A second optically opaque jacket 730 is situated below the waveguide 702 at or near a boundary of the waveguide 702. The first jacket 720 includes a region 722 comprising periodic structures 723 oriented toward the core of the waveguide 702. The second jacket 730 includes a region 732 comprising periodic structures 733 oriented toward the core of the waveguide 702. The periodic structure regions 722 and 732 have a length, l, that extends along a portion of the total length of the first and second jackets 720 and 730. It is noted that the length, l, of the periodic structure regions 722 and 732 can vary between the entire jacket length or only a portion thereof. In general, the length, l, of the periodic region 722 and 732 is at least about 10 μm or greater (e.g., ~10-200 μm). According to various embodiments, the minimum number of periodic structures 723 and 733 of the periodic structure regions 722 and 732 can vary between about 5 and 10 structures.

According to some embodiments, the waveguide 702 includes a reflection region, $R_1$ proximate the second terminal end of the waveguide 702 near the NFT 710. The waveguide 702 includes and absorption region, $R_2$, between the reflection region, $R_1$, and the optical coupler 706. In the reflection region, $R_1$, which typically has a length of about 20 to 50 μm, it is desirable to avoid extraneous absorption of stray light (e.g., due to the effects of displacement efficiency near the ABS 701). As such, the periodic structure regions 722 and 732 are situated within the absorption region, $R_2$, of the waveguide 702 according to some embodiments.

FIG. 8 illustrates a portion of a HAMR slider which includes an optical waveguide bounded by an optically opaque jacket arrangement in accordance with some embodiments. The embodiment shown in FIG. 8 is similar to that illustrated in FIG. 7, except that the optically opaque jacket arrangement includes a single jacket 820. In the embodiment illustrated in FIG. 8, the jacket 820 is situated above the waveguide 702 at or near a boundary of the waveguide 702. For example, the jacket 820 can be situated at or near a boundary of the upper cladding of the waveguide 702. The jacket 820 includes a region 822 of periodic structures 823 oriented toward the core of the waveguide 702.

FIG. 9 illustrates a portion of a HAMR slider which includes an optical waveguide bounded by an optically opaque jacket arrangement in accordance with other embodiments. The embodiment shown in FIG. 9 is similar to that illustrated in FIG. 7, except that the optically opaque jacket arrangement includes a single jacket 930. In the embodiment illustrated in FIG. 9, the jacket 930 is situated below the waveguide 702 at or near a boundary of the waveguide 702. For example, the jacket 930 can be situated at or near a boundary of the lower cladding of the waveguide 702. The jacket 930 includes a region 932 of periodic structures 933 oriented toward the core of the waveguide 702.

FIG. 10 shows a portion of an optically opaque waveguide jacket having a structured region that includes periodic structures in accordance with various embodiments. The portion of the waveguide jacket 1002 shown in FIG. 10 includes a structured region 1001 comprising an arrangement of spaced-apart periodic structures 1004, which are represented by pillars. Adjacent pillars 1004 are spaced apart from one another by a gap 1007 having a constant spacing, s. According to some embodiments, the pillars 1004 are formed from Cu, although other metals can be used. In some embodiments, the pillars 1004 are formed from Cu and include a top surface 1006 formed from Cr (e.g., ~30 nm of Cr). A dielectric material 1008 is disposed in the gap 1007 between adjacent pillars 1004. The dielectric material 1008 can be the same material used to form the cladding layer of the waveguide or other dielectric material. For example, the dielectric material 1008 can comprise AlO, SiO, TaO, or air.

In the embodiment shown in FIG. 10, the pillars 1004 have a generally rectangular shape. Each of the pillars 1004 has a height, h, of about 1 μm (e.g., 0.5-1 μm) and a width, w, of between about 300 nm and 3000 nm. The pillars 1004 typically have a length, l, (into and out of the page) equal to or exceeding the width of the waveguide (see, e.g., FIG. 4). For example, the pillars 1004 can have a length, l, ranging from about 1 μm to about 200 μm. In some embodiments, the top surface 1006 (e.g., formed from Cu or Cr) can have a rounded profile, as is shown in the exploded view A in FIG. 10. As was previously mentioned, the rounded edges of the pillars 1004 can facilitate a further reduction in specular scattering as compared to pillars 1004 having sharp corners. The constant spacing, s, between adjacent pillars 1004 can be about 1 μm or less (e.g., between ~0.5 and 3 μm). To provide for a reduction in specular reflection, the minimum number of gaps between adjacent pillars 1004 ranges between about 5 and 10.

FIG. 10 shows a stray light ray, A, impinging on a top surface of a pillar 1004. In this illustrative example, it is assumed that the stray light ray, A, has escaped the waveguide of the slider. As shown, the stray light ray, A, has a high angle of incidence, α, (e.g., >70-80°) relative to a plane perpendicular to the top surface of the pillar 1004. The periodic structure region 1001 is configured to organize stray light rays (e.g., light ray A) to enhance absorption of optical power by the waveguide jacket 1002. As shown in FIG. 10, the angle of incidence, α, of stray light ray A is increased to an angle, β by the periodic structure region 1001 (e.g., β=~90°). Organizing stray light rays in this manner results in a greater number of interactions between the stray light rays and the periodic structure region 1001, thereby enhancing absorption of optical power by the jacket 1002. It is noted that stray light rays having a low angle of incidence relative to a plane perpendicular to the top surface of the pillars 1004 can be reflected to and organized by a second jacket opposing the jacket 1002.

FIG. 10 also shows absorption of a stray light ray, B, that impinges on a vertical surface of the pillar 1004 at a low angle of incidence, θ, relative to a plane perpendicular to the vertical surface of the pillar 1004. The periodic structure region 1001 serves as a light trap for stray light rays that impinge the dielectric material 1008 between the pillars 1004.

FIG. 11 shows a portion of an optically opaque waveguide jacket having a structured region that includes periodic structures in accordance with other embodiments. The embodiment shown in FIG. 11 is similar to that shown in FIG. 10, but differs in terms of the material at the base of the structured region 1001. More particularly, a dielectric layer 1103 (e.g., a spacer) is disposed on a surface of the waveguide jacket 1102. The periodic structure region 1001 comprising pillars 1004 and dielectric material 1008 is formed on and above the dielectric layer 1103. The dielectric layer 1103 serves as a light trap by channeling light under the pillars 1004. The trapped light is absorbed in waveguide jacket 1102.

The dielectric layer 1003 can comprise AlO, TaO or SiO, for example. The waveguide jacket 1102 can be formed from W or other metal listed hereinabove. The dielectric layer 1103 can have an index of refraction, n, ranging between about 1.5 and 3. The dielectric material 1008 disposed within the gaps 1007 between adjacent pillars 1004 can have an index of refraction, n, ranging between about 1.5 and 3. The metal used to form the waveguide jacket 1102 can have an index of refraction, n, ranging between about 0.1 and 4.5, and an extinction coefficient, k, ranging between about 2.5 and 5.5.

Provision of the dielectric layer 1103 relaxes the requirements of the spacing dimension, s. More particularly, the embodiment of FIG. 11 allows for a wider range of gap sizes between adjacent pillars 1004, which provides greater flexibility during fabrication of the slider. For example, the spacing, s, between adjacent pillars 1004 can range between about 0.5 µm and 2 µm (e.g., 1.5-2 µm). Also, the minimum number of gaps 1007 to effectively reduce specular reflection in the embodiment shown in FIG. 11 can be less than that for the embodiment shown in FIG. 10. For example, the minimum number of gaps 1007 in the embodiment shown in FIG. 11 can be about 5.

Figure 12:
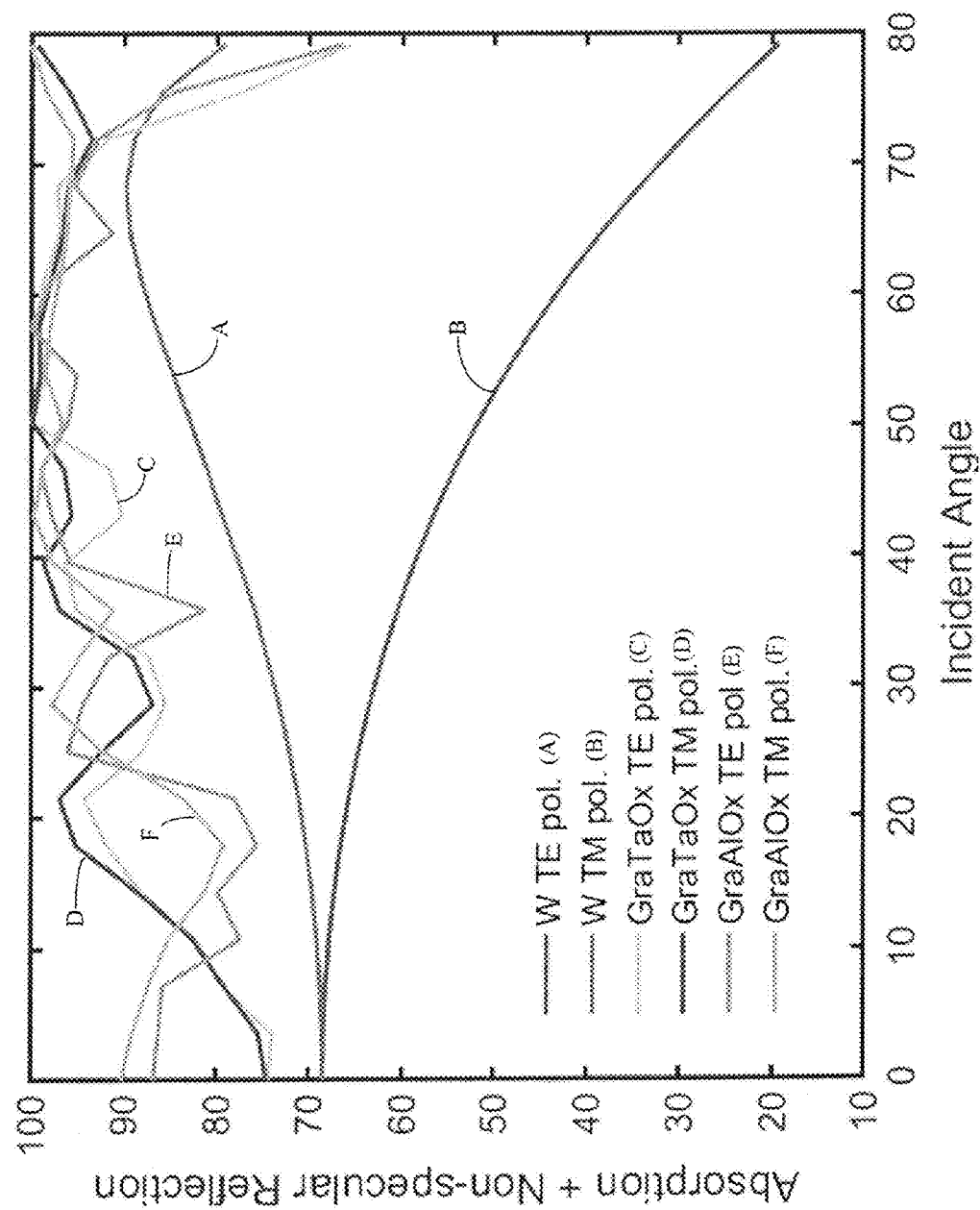
FIG. 12 is a graph showing specular reflection performance of different waveguide jackets in accordance with various embodiments.

FIG. 12 is a graph showing specular reflection performance of different waveguide jackets in accordance with various embodiments. The incident angle of stray light is plotted along the x-axis, and the absorption+non-specular reflection is plotted along the y-axis. It is noted that absorption+non-specular reflection is equivalent to 100 minus specular reflection (%). The better performing waveguide jackets are those approaching 100 along the y-axis.

Six different waveguide jackets were evaluated (A-F). Data for each of the waveguide jackets is represented by one of the curves A-F. Curve A corresponds to a planar jacket (no periodic structures) formed from W in which TE polarized light was used. Curve B corresponds to a planar jacket (no periodic structures) formed from W in which TM polarized light was used. Curve C-F correspond to waveguide jackets formed from W which include a dielectric spacer in accordance with the embodiment shown in FIG. 11. Curve C corresponds to a jacket with a spacer dielectric comprising TaO in which TE polarized light was used. Curve D corresponds to a jacket with a spacer dielectric comprising TaO in which TM polarized light was used. Curve E corresponds to a jacket with a spacer dielectric comprising AlO in which TE polarized light was used. Curve F corresponds to a jacket with a spacer dielectric comprising AlO in which TM polarized light was used. It can be seen in FIG. 12 that the waveguide jackets with periodic structures corresponding to curves C-F significantly outperform the planer waveguide jackets corresponding to curves A and B.

Figure 13:
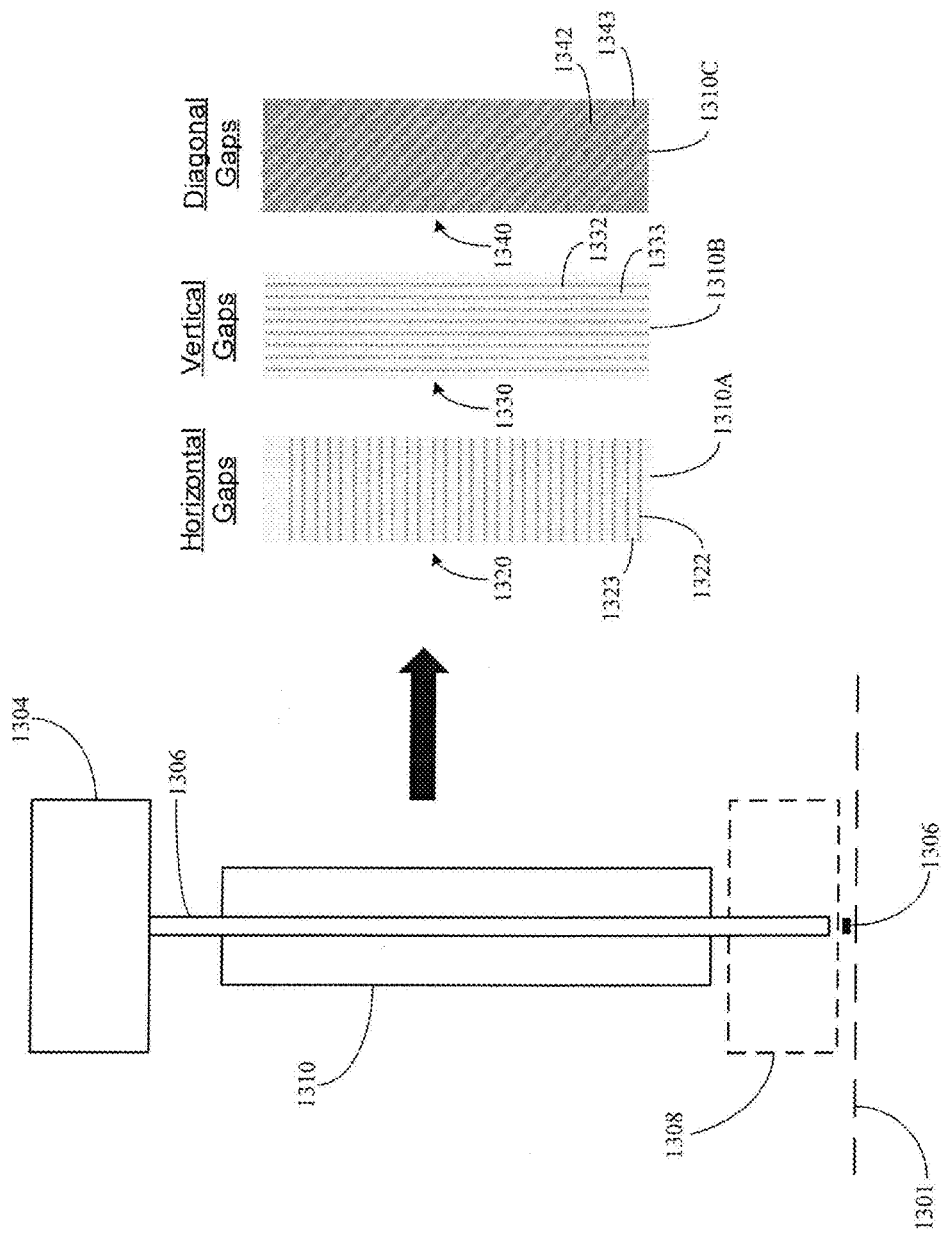
FIG. 13 illustrates a portion of a HAMR slider which includes at least one waveguide jacket incorporating a region of periodic structures in accordance with various embodiments.

FIG. 13 illustrates a portion of a HAMR slider which includes at least one waveguide jacket incorporating a region of periodic structures in accordance with various embodiments. FIG. 13 shows a laser 1304 coupled to a waveguide 1306. The waveguide 1306 communicates light generated by the laser 1304 to an NFT 1306 situated at or near an ABS 1301 of the slider. A writer 1308 is shown positioned adjacent the NFT 1306. A waveguide jacket 1310 is shown positioned under the waveguide 1306. As was discussed previously, a waveguide jacket 1310 can be positioned above and/or below the waveguide 1310.

FIG. 13 shows that the periodic structures of the waveguide jacket 310 can be oriented in different ways. For example, the waveguide jacket 1310A can include a periodic structure region 1320 comprising a series of pillars 1322 (dark gray) separated by gaps 1323 (light gray) of a fixed size. The gaps 1323 can be oriented substantially perpendicular to a longitudinal axis of the waveguide 1306. These gaps 1323 are referred to as horizontal gaps in this embodiment. As another example, the waveguide jacket 1310B can include a periodic structure region 1330 comprising a series of pillars 1332 (dark gray) separated by gaps 1333 (light gray) of a fixed size. The gaps 1333 can be oriented substantially parallel to the longitudinal axis of the waveguide 1306. These gaps are referred to as vertical gaps in this embodiment. By way of further example, the waveguide jacket 1310C can include a periodic structure region 1340 comprising a series of pillars 1342 (light gray) separated by gaps 1343 (dark gray) of a fixed size. The gaps 1343 can be oriented substantially diagonally relative to the longitudinal axis of the waveguide 1306. These gaps are referred to as diagonal gaps in this embodiment.

To demonstrate the efficacy of incorporating periodic structures in an optically opaque jacket situated on or adjacent the optical waveguide of a HAMR slider, modeling was performed. Modeling was performed for a standard jacket, and this data is summarized in Table 1 below. Modeling was performed for a jacket that incorporates periodic structures according to the embodiment shown in FIG. 10, and this data is summarized in Table 2 below. In the modeling, the periodic structures were defined as rectangular pillars extending from the jacket toward the waveguide core and having a height of about 1 µm. For Table 1, planar homogeneous films were formed from Cu or Cr. For the periodic structures of Table 2, the pillars were formed from Cu or Cu/Cr (e.g., a Cu pillar with a top surface of Cr having a thickness of ~30 nm). In Tables 1 and 2, TM refers to transverse magnetic polarization, and TE refers to transverse electric polarization.

TABLE 1

| Material | Polarization | Avg. Specular Reflection (0-80 degrees incidence) |
| --- | --- | --- |
| Cu | TM | 95% |
| Cu | TE | 95% |
| Cr | TM | 28% |
| Cr | TE | 65% |

TABLE 2

| Materia (structured) | Polarization | Avg. Specular Reflection (0-80 degrees incidence) |
| --- | --- | --- |
| Cu | TM | 30% |
| Cu | TE | 50% |
| Cu/Cr | TM | 10% |
| Cu/Cr | TE | 38% |

The data of Tables 1 and 2 demonstrate that an optically opaque waveguide jacket which incorporates periodic structures provides for a substantial reduction in specular reflection in comparison to an optically opaque waveguide jacket lacking periodic structures. For the waveguide jackets constructed from Cu, the periodic structures provide for a three-fold reduction in average specular reflection of TM polarized light and a two-fold reduction in average specular reflection of TE polarized light in comparison to a standard jacket. Similar results are realized for the waveguide jackets with periodic structures constructed from Cu/Cr in comparison to a standard jacket. It is noted that, in general, TE polarization is more reflective at high angles of incidence, and TM polarization is more absorbing at high angles of incidence. It is also noted that the modeling was conducted on pillars having sharp corners. If rounded edges were simulated (see, e.g., exploded view A in FIG. 10), specular scattering would be further reduced. Although the periodic structures (pillars) for Table 2 were formed from Cu and Cr, any opaque material can be used to form the periodic structures.

The data of Tables 1 and 2 demonstrate that an optically opaque waveguide jacket which incorporates periodic structures of the present disclosure provides for a significant reduction in specular reflection of TE and TM polarized light over a wide range of incident angles. In this regard, an optically opaque waveguide jacket of the present disclosure serves as an omni-directional, omni-polarization absorber of stray light that escapes from the waveguide.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider having an air bearing surface and configured for heat-assisted magnetic recording comprising:
   a write pole;
   a near-field transducer (NFT) proximate the write pole;
   an optical waveguide configured to receive light from a light source and couple the light to the NFT, the optical waveguide comprising first and second opposing major surfaces and opposing first and second edges connected to the first and second major surfaces;
   an optically opaque overlay disposed on or adjacent one or both of the first and second major surfaces of the optical waveguide; and
   periodic structures disposed on a surface of the optically opaque overlay facing the waveguide, the periodic structures configured to organize stray light emanating from the waveguide for absorption by the optically opaque overlay.

2. The apparatus of claim 1, wherein the optically opaque overlay is disposed on or adjacent the first and second major surfaces of the waveguide.

3. The apparatus of claim 1, wherein:
   the optically opaque overlay extends from at or near the air bearing surface of the slider into a body of the slider; and
   the periodic structures are disposed on the overlay surface spaced away from the air bearing surface by at least about 20 µm.

4. The apparatus of claim 1, wherein the periodic structures are configured as an omni-directional, omni-polarization absorber of stray light emanating from the waveguide.

5. The apparatus of claim 1, wherein the periodic structures are formed from Cu.

6. The apparatus of claim 1, wherein the periodic structures are formed from Cu and a layer of Cr over the Cu.

7. The apparatus of claim 1, wherein the periodic structures have rounded edges.

8. The apparatus of claim 1, wherein a gap between adjacent periodic structures ranges between about 1 and 2 µm.

9. The apparatus of claim 1, wherein a gap between adjacent periodic structures is filled with a dielectric material.

10. The apparatus of claim 1, wherein the periodic structures have a height of up to about 1 µm.

11. An apparatus, comprising:
    a slider having an air bearing surface and configured for heat-assisted magnetic recording comprising:
    a write pole;
    a near-field transducer (NFT) proximate the write pole;
    an optical waveguide configured to receive light from a light source and couple the light to the NFT, the optical waveguide comprising first and second opposing major surfaces and opposing first and second edges connected to the first and second major surfaces;
    an optically opaque overlay disposed on or adjacent one or both of the first and second major surfaces of the optical waveguide;
    a layer of dielectric material disposed on a surface of the optically opaque overlay facing the waveguide; and
    periodic structures disposed on the layer of dielectric material, the periodic structures configured to organize stray light emanating from the waveguide for absorption by the optically opaque overlay.

12. The apparatus of claim 11, wherein the optically opaque overlay is disposed on or adjacent the first and second major surfaces of the waveguide.

13. The apparatus of claim 11, wherein:
    the optically opaque overlay extends from at or near the air bearing surface of the slider into a body of the slider; and
    the layer of dielectric material and periodic structures are disposed on the overlay surface spaced away from the air bearing surface by at least about 20 µm.

14. The apparatus of claim 11, wherein the periodic structures are configured as an omni-directional, omni-polarization absorber of stray light emanating from the waveguide.

15. The apparatus of claim 11, wherein the periodic structures are formed from Cu.

16. The apparatus of claim 11, wherein the periodic structures are formed from Cu and a layer of Cr over the Cu.

17. The apparatus of claim 11, wherein the periodic structures have rounded edges.

18. The apparatus of claim 11, wherein a spacing between adjacent periodic structures ranges between about 1 and 2 µm.

19. The apparatus of claim 11, wherein a gap between adjacent periodic structures is filled with a dielectric material.

20. The apparatus of claim 11, wherein the periodic structures have a height of up to about 1 µm.

* * * * *